(12) United States Patent
Singh et al.

(10) Patent No.: US 9,178,810 B1
(45) Date of Patent: Nov. 3, 2015

(54) HANDLING ENTROPY LABELS WHEN STITCHING LABEL-SWITCHED PATHS

(71) Applicant: Juniper Networks, Inc., Sunnyvale, CA (US)

(72) Inventors: Ravi Singh, Burlingame, CA (US); John E. Drake, Pittsburgh, PA (US); Adrian Farrel, Llangollen (GB); Yimin Shen, Shrewsbury, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 147 days.

(21) Appl. No.: 13/952,254

(22) Filed: Jul. 26, 2013

(51) Int. Cl.
*H04L 12/723* (2013.01)
*H04L 12/803* (2013.01)
*H04L 29/08* (2006.01)

(52) U.S. Cl.
CPC .............. *H04L 45/50* (2013.01); *H04L 47/125* (2013.01); *H04L 67/1002* (2013.01)

(58) Field of Classification Search
CPC ....... H04L 45/00; H04L 45/50; H04L 47/125; H04L 67/1002; H04L 67/1008
See application file for complete search history.

(56) References Cited

U.S. PATENT DOCUMENTS

| 7,948,986 B1* | 5/2011 | Ghosh et al. ................... 370/392 |
| 2011/0164503 A1* | 7/2011 | Yong et al. ..................... 370/237 |
| 2014/0226662 A1* | 8/2014 | Frost et al. ..................... 370/392 |

OTHER PUBLICATIONS

The use of entropy label in MPLS forwarding, IETF RFC 6790, by Kompella et al., Nov. 2012.*

Singh et al. "Entropy Label for Seamless MPLS" MPLS Working Group, Internet Draft, Feb. 18, 2013, 21 pgs.
Rosen et al. "Multiprotocol Label Switching Architecture" Network Working Group, RFC 3031, Jan. 2001, 62 pgs.
Awduche et al. "RSVP-TE: Extensions to RSVP for LSP Tunnels" Network Working Group, RFC 3209, Dec. 2001, 62 pgs.
Mannie, "Generalized Mutli-Protocol Label Switching (GMPLS) Architecture" Network Working Group, RFC 3945, Oct. 2004, 70 pgs.
Andersson et al. "LDP Specification" Network Working Group, RFC 5036, Oct. 2007, 136 pgs.
Ayyangar et al. "Label Switched Path Stitching with Generalized Multiprotocol Label Switching Traffic Engineering (GMPLS TE)" Network Working Group, RFC 5150, Feb. 2008, 20 pgs.
Farrel et al. "Inter-Domain MPLS and GMPLS Traffic Engineering—Resource Reservation Protocol-Traffic Engineering (RSVP-TE) Extensions" Network Working Group, RFC 5151 Feb. 2008, 25 pgs.

(Continued)

*Primary Examiner* — Ashley Shivers
(74) *Attorney, Agent, or Firm* — Shumaker & Sieffert, P.A.

(57) ABSTRACT

In one example, a stitching point routing device, which stitches a previous segment of an end-to-end label-switched path (LSP) to a next segment of the end-to-end LSP, includes network interfaces configured to receive packets via the previous segment and send packets via the next segment, and one or more processors configured to determine whether the next segment supports entropy labels, determine whether a packet received from the previous segment is encapsulated by a label stack including an entropy label, when the next segment does not support entropy labels and when the packet is encapsulated by the label stack including the entropy label, remove the entropy label from the label stack, when the next segment supports entropy labels and when the packet is not encapsulated by the label stack including the entropy label, add an entropy label to the label stack, and forward the packet along the next segment.

27 Claims, 9 Drawing Sheets

(56) References Cited

OTHER PUBLICATIONS

Berger et al. "Generalized MPLS (GMPLS) Data Channel Switching Capable (DCSC) and Channel Set Label Extensions" Internet Engineering Task Force (IETF), RFC 6002, Oct. 2010, 11 pgs.

Smith et al. "Label Edge Router Forwarding of IPv4 Option Packets" Internet Engineering Task Force (IETF), RFC 6178, Mar. 2011, 10 pgs.

Bryant et al. "Flow-Aware Transport of Psuedowires over an MPLS Packet Switched Network", Internet Engineering Task Force (IETF), RFC 6391, Nov. 2011, 20 pgs.

Kompella et al. "The Use of Entropy Labels in MPLS Forwarding" Internet Engineering Task Force (IETF), RFC 6790, Nov. 2012, 26 pgs.

\* cited by examiner

HANDLING ENTROPY LABELS WHEN STITCHING LABEL-SWITCHED PATHS

TECHNICAL FIELD

This disclosure relates to computer networks, and more particularly, to tunneling packets through computer networks.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

The Transmission Control Protocol (TCP) is a common transport-layer protocol by which network devices transport packets according to a packet-switching scheme. In some examples, a circuit-switching scheme or network tunneling scheme, such as Asynchronous Transfer Mode (ATM) over router networks, link emulation using the Internet Protocol (IP) or the Multiprotocol Label Switching (MPLS) protocol, and High-Level Data Link Control (HDLC) over IP or MPLS is more appropriate. In some cases, a client MPLS network utilizes MPLS internally, and also uses a service provider MPLS core to transport MPLS traffic between remote client sites.

SUMMARY

In general, this disclosure describes techniques for handling entropy labels when stitching label-switched paths (LSPs).

In one example, a method includes determining, by a notional egress routing device, whether a next segment of an end-to-end label-switched path (LSP) for a packet, encapsulated by a label stack including an entropy label, supports entropy labels, wherein the notional egress routing device comprises a routing device of a current segment of the end-to-end LSP, when the next segment does not support entropy labels, removing the entropy label from the label stack of the packet, and forwarding the packet along the end-to-end LSP.

In another example, a method includes determining, by a notional ingress routing device, whether a packet, received from a previous segment of an end-to-end label-switched path (LSP) for the packet, is encapsulated by a label stack that includes an entropy label, wherein the notional ingress routing comprises a routing device of a current segment of the end-to-end LSP, when the current segment supports entropy labels and the label stack does not include an entropy label, adding an entropy label to the label stack of the packet, and forwarding the packet along the current segment.

In another example, a stitching point routing device, which stitches a previous segment of an end-to-end label-switched path (LSP) to a next segment of the end-to-end LSP, includes one or more network interfaces configured to receive packets via the previous segment and send packets via the next segment, and one or more processors configured to determine whether the next segment supports entropy labels, determine whether a packet received from the previous segment is encapsulated by a label stack including an entropy label, when the next segment does not support entropy labels and when the packet is encapsulated by the label stack including the entropy label, remove the entropy label from the label stack, when the next segment supports entropy labels and when the packet is not encapsulated by the label stack including the entropy label, add an entropy label to the label stack, and forward the packet along the next segment.

In another example, a computer-readable storage medium has stored thereon instructions that, when executed, cause a processor of a stitching point routing device that stitches a previous segment of an end-to-end label-switched path (LSP) to a next segment of the end-to-end LSP to determine whether the next segment supports entropy labels, determine whether a packet received from the previous segment is encapsulated by a label stack including an entropy label, when the next segment does not support entropy labels and when the packet is encapsulated by the label stack including the entropy label, remove the entropy label from the label stack, when the next segment supports entropy labels and when the packet is not encapsulated by the label stack including the entropy label, add an entropy label to the label stack, and forward the packet along the next segment.

The details of one or more examples are set forth in the accompanying drawings and the description below. Other features, objects, and advantages will be apparent from the description and drawings, and from the claims.

DETAILED DESCRIPTION

Figure 1:
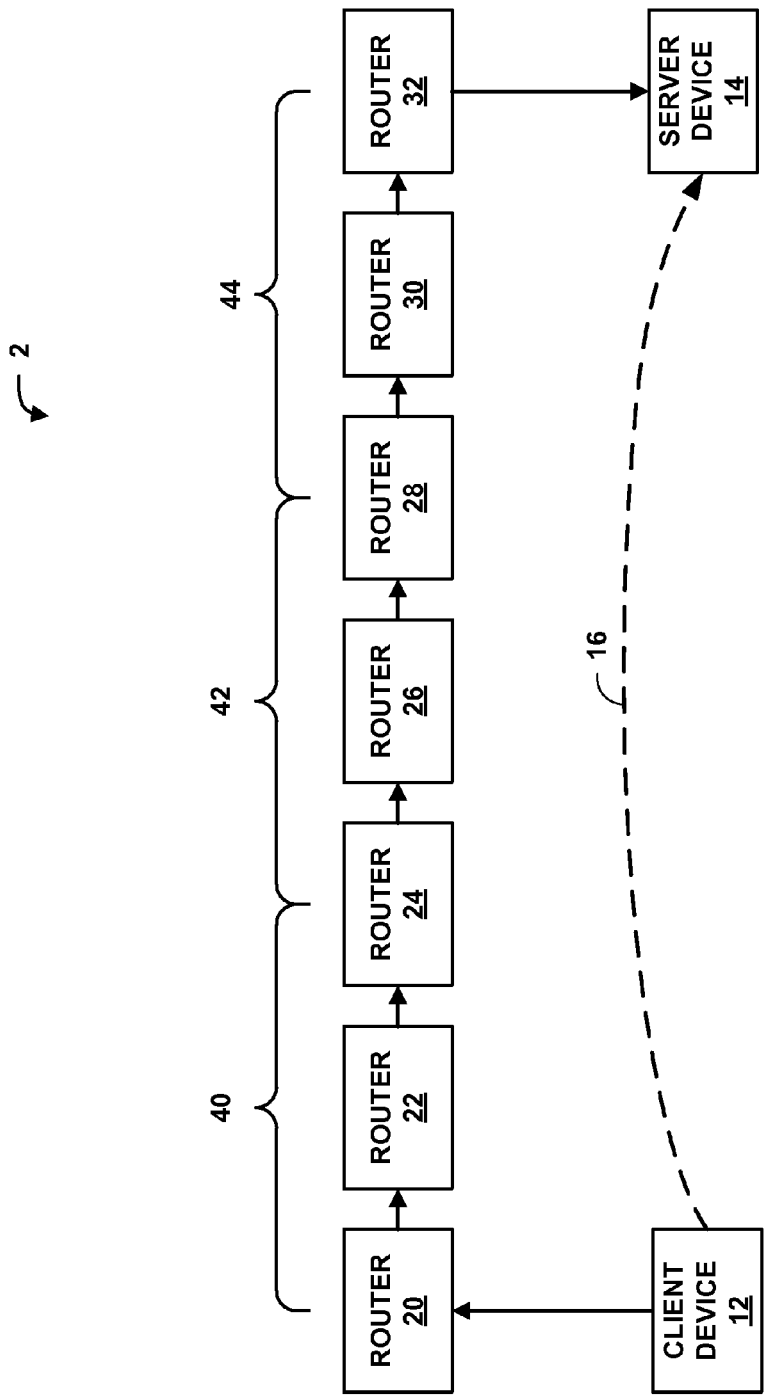
FIG. 1 is a block diagram illustrating an example system in which client device sends data to server device via an end-to-end label-switched path (LSP).

FIG. 1 is a block diagram illustrating an example system 2 in which client device 12 sends data to server device 14 via end-to-end label-switched path (LSP) 16. LSP 16 is formed by routers 20-32, in this example, although it should be understood that additional network devices, e.g., additional routers not shown in FIG. 1, may form LSP 16. In this example, routers 20-32 are label switch routers (LSRs) along LSP 16. In the example of FIG. 1, LSP 16 is separated into segments 40, 42, 44. Segments 40, 42, 44 may, for example, correspond to different autonomous systems that are managed by different entities. Routers between two segments of LSP 16 are referred to as "stitching point" routers in this disclosure. Routers 24 and 28 represent examples of stitching point routers.

Routers 20-32 execute protocols for establishing paths, such as tunnel LSP 16. Such protocols may include, for example, link distribution protocol (LDP) or resource reservation protocol with traffic engineering extensions (RSVP-TE). LDP is described by "LDP Specification," L. Andersson et al., Network Working Group, RFC 5036, October 2007, which is hereby incorporated by reference in its entirety. RSVP-TE is described by "RSVP-TE: Extensions to RSVP for LSP Tunnels," D. Awduche et al., Network Working Group, RFC 3209, December 2001, which is updated by "Inter-Domain MPLS and GMPLS Traffic Engineering—Resource Reservation Protocol-Traffic Engineering (RSVP-TE) Extensions," A. Farrel et al., Network Working Group, RFC 5151, February 2009, which are both hereby incorporated by reference in their respective entireties.

In general, packets directed along LSP 16 are encapsulated by one or more labels in a label stack, e.g., in accordance with Multi-Protocol Label Switching (MPLS). In this manner, to direct traffic along an LSP, a router along the LSP may use a label of the label stack of a received packet to determine the "next hop" for the packet, that is, the next network device to which to forward the packet. In addition, the router may pop one or more labels from the label stack and push a new label onto the label stack, which causes the next hop to direct the packet along the LSP.

Although LSP 16 of FIG. 1 is shown as corresponding to routers 20-32 in FIG. 1, in some examples, an LSP may be implemented using various, different sets of routers, e.g., to achieve load balancing. For instance, two or more client devices may essentially use LSP 16 to communicate with server device 14. Rather than directing all traffic of each of these client devices along routers 20-32, a load balancing algorithm, such as equal-cost multipath (ECMP) may be used to distribute the traffic among different sets of devices that, ultimately, achieve the result of directing all traffic from the client devices to server device 14.

In general, when determining which of the sets of devices to direct traffic along to reach server device 14 when using a load-balancing algorithm, a routing device computes a hash of the label stack of packets of the traffic. Assuming that two or more client devices are using the same path, however, the label stack will be the same for each client device. Therefore, RFC 6790 (K. Kompella et al., "The Use of Entropy Labels in MPLS Forwarding," November 2012, available at http://tools.ietf.org/html/rfc6790, which is hereby incorporated by reference) proposed adding an entropy label into the label stack. The entropy label may be distinct for a particular packet flow directed along an LSP, such that a hash performed on the label stack for each packet of the packet flow will be directed along the same set of devices for the LSP, which may avoid out-of-order delivery for packets of the packet flow, but still allow for load balancing of different flows from the same client device.

RFC 6790 is directed to using entropy labels when load balancing traffic for a single LSP. That is, devices along a single LSP may use the entropy label, and the last or penultimate router of the LSP is expected to remove the entropy label before forwarding the packet beyond the LSP. However, this disclosure recognizes that there are instances where two or more LSPs are stitched together. Stitching of two or more LSPs together may form a single, end-to-end LSP, where the various intermediate LSPs may be referred to as segments of the end-to-end LSP ("LSP segments"). Segments 40, 42, 44 of FIG. 1 represent examples of segments of end-to-end LSP 16 that can be stitched together using the techniques of this disclosure.

Various situations may occur, e.g., based on whether either or both of two LSPs that are stitched together are capable of using entropy labels. Thus, stitching point routers, that is, routers used to stitch LSPs together, may be configured, in accordance with the techniques of this disclosure, to handle these various scenarios. That is, segments 40, 42, 44 of end-to-end LSP 16 may have independent levels of support for entropy labels. Thus, stitching point routers, such as routers 24, 28, may be configured with the techniques of this disclosure to stitch segments 40, 42, 44 together.

As one example, this disclosure recognizes that, given a first LSP stitched to a second LSP where both the first LSP and the second LSP are capable of using entropy labels, it would be more efficient to reuse the entropy label pushed by an ingress router of the first LSP when packets are directed along the second LSP. For instance, assuming that segment 40 is entropy label capable and that segment 42 is entropy label capable, and that router 24 receives a packet on segment 40 that is encapsulated by a label stack including an entropy label, router 24 may leave the entropy label on the label stack when forwarding the packet along LSP 16. Router 24 may also remove the incoming outer label (e.g., a label corresponding to segment 40 that is above the entropy label in the label stack) and add an outgoing outer label (corresponding to segment 42) to the label stack above the entropy label.

In this manner, the ingress point, e.g., a routing device, to a sequence of two or more entropy label capable LSP segments and the egress point from the sequence of the two or more entropy label capable LSP segments are not necessarily the ingress and egress to/from the same individual segment. The ingress to a sequence of two or more entropy label capable LSP segments is referred to in this disclosure as a "notional ingress", and the egress from such a sequence is referred to herein as a "notional egress." In other words, a notional ingress and a notional egress pair may be, respectively, segment ingress and segment egress for different LSP segments that are part of the same end-to-end LSP. For instance, assuming that segments 40 and 42 are entropy label capable, but segment 44 is not entropy label capable, router 20 may serve as the notional ingress and router 28 may serve as the notional egress, while router 24 may serve as a stitching point router between segments 40, 42.

As another example, if both the first LSP and the second LSP are capable of using entropy labels, but a packet arrives at the stitching point router without an entropy label, a stitching point router may add an entropy label to the label stack of the packet before forwarding the packet along the second LSP. For instance, again assuming that segments 40, 42 are entropy label capable, router 24 may remove an incoming label from a label stack for a packet received from segment 40, add an entropy label to the label stack, add an outgoing label to the label stack, and then forward the packet along segment 42.

As another example, if the first LSP is entropy label capable but the second LSP is not entropy label capable, the stitching point router may remove an entropy label from the label stack of a packet received from the first LSP before forwarding the packet along the second LSP. For instance, if segment 40 is entropy label capable but segment 42 is not entropy label capable, router 24 may remove an incoming label and an entropy label from the label stack of a packet received from segment 40 before adding an outgoing label to the label stack and forwarding the packet along segment 42.

As yet another example, if the first LSP is not entropy label capable but the second LSP is entropy label capable, the stitching point router may add an entropy label to the label stack of the packet before forwarding the packet along the second LSP. For instance, assuming that segment 40 is not entropy label capable but segment 42 is entropy label capable, router 24 may remove an incoming label from a label stack for a packet received from segment 40, add an entropy label to the label stack, add an outgoing label to the label stack, and then forward the packet along segment 42.

It should be understood that adding or removing an entropy label may also include adding or removing an entropy label indicator, in accordance with RFC 6790. Thus, in the various examples above, where an entropy label is added or removed, an entropy label indicator may also be added or removed.

This disclosure refers to an ingress to an entropy label capable segment as a notional ingress router, and an egress from an entropy label capable segment of an end-to-end LSP as a notional egress router. Thus, assuming that segments 40 and 42 are entropy label capable, but segment 44 is not entropy label capable, router 20 acts as a notional ingress router and router 28 acts as a notional egress router for a sequence of segments (segments 40 and 42) that are entropy label capable. In other words, in this example, although router 24 acts as the actual egress for segment 40, and the actual ingress for segment 42, router 20 acts as the notional ingress (that is, the router responsible for adding the entropy label) to a packet that is to traverse segments 40 and 42, and router 28 acts as the notional egress (that is, the router responsible for removing the entropy label) from the packet.

More generally, a stitching point router may refer to a router between two segments of an end-to-end LSP that stitches those segments together to form a portion of the end-to-end LSP. A stitching point router may be configured to act as a notional ingress router and/or as a notional egress router. That is, a router that has been constructed or configured to act as a stitching point router may be configured (e.g., at the time of deployment) to act as either or both of a notional ingress router and/or a notional egress router.

As discussed above, the techniques of this disclosure may be used to extend the techniques of RFC 6790. RFC 6790 specifies a way to implement load-balancing in an MPLS network such that sub-flows of an LSP may be identified and sent on different paths through the network. Per RFC 6790, this is achieved by using entropy labels (ELs) to abstract out the flow-identifying information into the entropy label and inserting the entropy label underneath the LSP label. The transit LSRs perform the load-balancing hash computation, on the label-stack alone, to effect a good load balancing outcome without a need to parse inner headers.

In RFC 6790, a transport label pushing router inserts an entropy label indicator and an entropy label. This transport label pushing router also pushes the transport LSP's label. An ingress label edge router (LER), such as the transport label pushing router, inserts the entropy label indicator and entropy label only if the egress router has signaled the ability to strip off the entropy label indicator and entropy label. A transport label popping router (e.g., the egress router or penultimate hop router) removes the entropy after the entropy label has been exposed as the top label on the packet, e.g., due to popping the transport label. The removal of the entropy label may be performed either when the entropy label indicator is the top label or when the entropy label indicator is the next label below the top label being popped.

One of the features of RFC 6790 is that it defines the entropy label in the context of a given LSP. RFC 6790 defines the signaling extensions by which the entropy label capability might be signaled for LSPs setup, e.g., by Resource Reservation Protocol—Traffic Engineering (RSVP-TE), Label Distribution Protocol (LDP), or Border Gateway Protocol—Labeled Unicast (BGP-LU). While that works well for individual LSPs, there are additional issues to consider for the seamless MPLS (SMPLS) architecture.

The currently-under-definition framework for seamless MPLS proposes an architecture (S-MPLS) that is to allow for establishing MPLS LSPs from access nodes to access nodes using a medley of signaling protocols and statically configured LSPs. There are special entropy label related considerations that need to be dealt with to make entropy label more suitable for seamless MPLS.

As discussed above, the techniques of this disclosure define additional abstractions and rules for the use of entropy-labels with LSP stitching/hierarchy to enable the use of entropy labels for the seamless MPLS architecture. This disclosure describes how entropy labels may be used when the LSP has been setup by stitching LSP segments or by tunneling the LSP over other LSPs. It is conceivable that different signaling protocols are in use to create an end-to-end LSP.

LSP stitching is the process of connecting LSP segments in the data plane to form a single end-to-end data plane LSP. This is achieved by setting up LSP segments through signaling or through management action, and then signaling an end-to-end LSP that "uses" these LSP segments as hops in its path. The procedures for LSP stitching are described in A Ayyangar et al., "Label Switched Path Stitching with Generalized Multiprotocol Label Switching Traffic Engineering (GMPLS TE)," Network Working Group, RFC 5350, February 2008, available at http://tools.ietf.org/html/rfc5150, which is hereby incorporated by reference in its entirety. Labeled data traffic flowing over end-to-end MPLS LSPs, that have been setup using multiple different protocols (by stitching together segments), would benefit from having the entropy label be included in it.

LSP hierarchy has been described in RFC 6790 and L. Berger et al., "Generalized MPLS (GMPLS) Data Channel Switching Capable (DCSC) and Channel Set Label Extensions," Internet Engineering Task Force (IETF), RFC 6002, October 2010, which is hereby incorporated by reference in its entirety. Usage of entropy labels in LSP hierarchies has some peculiar practical issues that will benefit from some additional flexibility in inserting entropy labels for a specific layer in an LSP hierarchy. This disclosure also describes techniques for using entropy labels in an LSP hierarchy.

RFC 6790 defines entropy label signaling/usage suitable for single-segment LSPs. However, as MPLS proliferates in the network access leading to the setup of end-to-end LSPs using LSP stitching and hierarchies, this disclosure recognizes that there is a need to define the entropy label behavior for LSP stitching and LSP hierarchies. RFC 6790 does not explicitly specify the entropy label signaling-interaction between stitched LSPs segments. Similarly, peculiarities in the dataplane related to LSP stitching need further specification. Likewise, the signaling and data-plane peculiarities for using entropy label over LSP hierarchies could be further specified.

It may be desirable to get the benefits of entropy label even for stitched LSPs. Certain aspects peculiar to stitched LSPs need additional handling to increase the applicability of RFC 6790. RFC 6790 needs to be extended to define the behavior for LSP stitching and LSP hierarchies (tunneling) when using entropy labels.

Various specific additional requirements for making entropy label more deployable when used with LSP stitching, and LSP hierarchy are discussed below.

The seamless MPLS architecture relies on the use of LSP stitching and hierarchy to signal an end-to-end LSP between access-nodes, such that the end-to-end LSP is going over aggregation/transport/cores nodes. The signaling of such end-to-end LSPs is enabled by using the stitching/hierarchy mechanisms that exist, using BGP-LU/LDP/RSVP. The rules described below provide a general-purpose way for the use of entropy labels across end-to-end LSPs by defining the rules of entropy label capable (ELC) propagation at stitching points; the data-plane guidelines for the stitching point LSR; and the data-plane guidelines for LSP hierarchies for inserting an entropy label indicator and an entropy label at an ingress LER of an LSP in an LSP hierarchy.

A stitched end-to-end LSP might be stitched from greater than two segment LSPs (along the length of the end-to-end LSP), with 2 LSPs forming the stitch at each stitching point. An LSP segment is considered to be intrinsically entropy label capable when it supports the attributes summarized below. Some of the segment LSPs in the end-to-end LSP may intrinsically support entropy labels, and some may not. So, the end-to-end LSP may not intrinsically support entropy labels from end to end. However, to obtain the benefits of entropy label for stitched LSPs, it is important that an entropy label should be present on the data packets traversing as many segments of the end-to-end LSP as is possible within data plane abilities of the routers on the way.

In using entropy label with LSP stitching, the aims are BOTH of the following. First, getting entropy label benefits wherever possible, on all segments where possible. Just because a given segment does not support entropy labels is not a reason to deny entropy label benefits to other segments of the end-to-end LSP. Second, avoid running into data-plane problems where an intermediate-segment whose ingress LER cannot examine deeper to remove entropy label when the subsequent segment does not support entropy labels.

In addition, there may be independent setup of LSP segments. LSP stitching typically relies on LSP segments that have been independently set up. In an end-to-end LSP (made of stitched segments), it is unlikely that all of the stitching points (i.e., segment LSP end points) as well as the ultimate ingress and ultimate egress support entropy labels as defined in this disclosure. However, there would be individual LSP segments that would completely satisfy the requirements of being intrinsically entropy label capable. This disclosure describes how entropy label may be used for (portions of) the end-to-end LSP while still working within the framework for RFC 6790.

This disclosure defines new abstractions that may be used to handle differences in the use of entropy labels for stitched-LSPs as compared to use for single-segment LSPs. Differences include the notion of ingress for entropy label insertion entropy label indicator and entropy label insertion might not necessarily be done by a label-PUSHing router. A stitching point where the label is being swapped might do the entropy label indicator and entropy label insertion, and serves as a "notional ingress."

The differences also include the notion of egress for entropy labels. "Notional-egress" might not be the segment egress for the segment of the notional-ingress. Even though certain stitching-points (segment LERs) might not support POPing entropy label indicator and entropy label, it may be acceptable to let the entropy label indicator and entropy label continue to be on the packet since the egress of a subsequent segment has the capability to POP the entropy label indicator and entropy label (which may not necessarily be along with POPing the transport label). A "notional-ingress and notional-egress" pair might actually be the segment-ingress and segment-egress for different LSP segments that are part of the same end-to-end LSP.

The portion of the stitched end-to-end LSP, between a notional-ingress and a notional-egress is referred to as the "notional-LSP-segment" in this disclosure. As a packet traverses an end-to-end LSP, it may have an entropy label indicator and entropy label imposed on it and then removed at different routers.

It may be desirable for there to not be more than one instance of an entropy label indicator and entropy label to appear on a packet at any given time. However, the insertion followed by removal of an entropy label indicator and entropy label may happen more than once as the packet traverses the end-to-end LSP. Each router doing the entropy label indicator and entropy label insertion is the notional-ingress and each router doing the entropy label indicator and entropy label removal is the notional-egress (or notion EL-stripping-PH-router).

Thus, there may be more than one "notional ingress" for entropy label insertion, and there may be more than one "notional egress" for entropy label removal. For each "notional ingress," there will be a "notional egress" with the "notional ingress"es and "notional egress"es alternating along the path of the end-to-end LSP when there are more than one notional ingress and egress for an end-to-end LSP. In the simplest case, this condenses to the case of there being just one notional ingress and one notional egress; and the notional ingress coincides with the end-to-end ingress, and the notional-egress coincides with the end-to-end egress. That is the case that RFC 6790 addresses.

Separation of control/data-plane implies that certain routers might be running software that supports signaling entropy label capability and indicative of whether an egress is entropy label capable. However, certain routers might not have the capability to insert entropy label indicator and entropy label. Such routers should not be allowed to behave poorly in preventing entropy label benefits for traffic traversing over them via stitched LSPs. In other words, such routers cannot act as notional-ingress or notional-egress. However, the presence of such per-segment ingress/egress routers on the path of a notional segment-LSP should not prevent the notional segment-LSP from benefiting from the use of entropy labels.

The rules for propagating ELC, at stitching points, from a downstream segment LSP to an upstream segment LSP are listed in this section. There is benefit in propagating ELC across stitching points is to not have to re-compute the entropy label at different segment ingress for those segments that are entropy label capable, including when the LSP segments have been setup using different protocols.

Additionally, in certain cases it should be possible to get benefits of entropy label indicator and entropy label on LSP segments that are not "intrinsically entropy label capable," where the lack of "intrinsic entropy label capability" is due to one or more of the per-segment ingress does not support entropy label insertion and/or the per-segment PHR/egress does not support entropy label POPing.

However, such a stitching point might support ELC signaling. At a stitching point, when two LSP segments: L1 (incoming LSP) and L2 (the outgoing LSP) are being stitched, the following rules should be followed by stitching point in signaling its entropy label capability.

A segment-egress may signal positive entropy label capability for an LSP-segment L1 when the segment-egress is intrinsically entropy label capable, or when it is not intrinsically entropy label capable but a segment-egress for LSP-segment L2 (downstream of L1)—for which this stitching-point is a segment-ingress—is signaling positive entropy label capable. This handles the case for supporting the signaling of entropy label capability, even though the router may not support the data-plane behavior of entropy label capability.

A segment-egress may signal negative entropy label capability if both of the following are true: the segment-egress is also segment-ingress for another LSP-segment whose segment-egress is not entropy label capable, and this router does not have the ability to remove an entropy label indicator and an entropy label inserted by the segment-ingress for the LSP-segment for which this router is the segment-egress.

The following may be relevant for RSVP as defined in RFC 6790. When a router acting as segment-egress for an LSP L1 (that is stitched to a downstream LSP L2) is signaling entropy label capability for L1, then this router may signal entropy label capability in Path messages using the mechanism defined in RFC 6790.

This is relevant in the context of bidirectional LSPs. At a stitching point, when 2 LSP segments—L1 (the incoming LSP) and L2 (the outgoing LSP)—are being stitched, the stitching point router may obey the following rules in its data-plane behavior. The stitching point router may rationalize entropy labels for the outgoing LSP segment. When the LSP segments L1 and L2 differ in their entropy label capabilities, the stitching point router may take the following data-plane actions, depending on its role for the end-to-end LSP. For notional egress behavior, when L1 intrinsically supports ELC and L2 does not, then the stitching-point router removes the entropy label indicator and entropy label, if present under top label, from the received data packets, before effectively SWAPping the top label. In other words, in the presence of the entropy label indicator, the operations performed include: POP(IncomingLabel), POP(entropy label indicator and entropy label), PUSH(OutgoingLabel). Alternatively, the operations may be POP, POP, SWAP(OutgoingLabel).

For notional ingress behavior, when L1 does not intrinsically support entropy labels but L2 is entropy label capable, then the stitching point router POPs the incoming label, inserts an entropy label indicator and an entropy label before PUSHing the label for the LSP segment L2. The label operations performed would be POP(IncomingLabel), PUSH(EL), PUSH(ELI), PUSH(OutgoingLabel) or SWAP(EL), PUSH(ELI), PUSH(OutgoingLabel).

For implicit notional ingress behavior, when L1 is intrinsically entropy label capable and so is L2, the arriving data traffic should already have an entropy label indicator and an entropy label on it. However, it is possible that due to local configuration on the notional-ingress, the entropy label indicator and entropy label is not being inserted. In that case, traffic arriving on L1 will not have entropy label indicator and entropy label on it. In that case, this stitching-point router is the "implicit notional ingress," and it should insert the entropy label indicator and entropy label just as if it were a "notional ingress."

A segment-ingress that is intrinsically-entropy-label-capable should have the ability to inspect received data packets to check whether an entropy label indicator and entropy label already exists on the data packet underneath the top label. To avoid causing multiple entropy labels on a data packet, when both the LSP segments L1 and L2 support entropy labels, the stitching point router may insert an entropy label indicator and entropy label only if the incoming packet does not contain an entropy label indicator and entropy label underneath the top label. In that case, the label operations are as below: POP(IncomingLabel), PUSHentropy label indicator and entropy label, PUSH(OutgoingLabel). However, if the incoming packet already contains an entropy label indicator and entropy label underneath the top label, the stitching point router would not insert an additional entropy label indicator and entropy label on the packet underneath the top label that is being effectively SWAPed. This prevents a segment ingress from inserting an entropy label indicator and entropy label when the notional ingress has already inserted an entropy label indicator and entropy label.

A stitching point router that is intrinsically-entropy-label-capable should have the ability to inspect received data packets to check whether an entropy label indicator and entropy label already exists, underneath any label in the label-stack. If the router has such a ability, then this router need not insert an entropy label indicator and entropy label when the entropy label indicator and the entropy label are already present in the label stack. This helps to prevent multiple entropy label indicator and entropy labels on the packet inserted (at a stitching point) in the context of different transport labels in a label hierarchy.

The role of notional ingress router can change due to local configuration on the router or due to segment egress starting/stopping to signal ELC possibly due to a configuration change at the segment egress or due to a configuration change at this router. When this router becomes a notional ingress, it reacts to the change as discussed above. When this router stops being a notional ingress, this router stops inserting the entropy label indicator and entropy label underneath the top label that this router is SWAPing (if this router is stitching point), or PUSHING (if this router is end-to-end ingress).

The role of notional egress router can change due to local configuration on the router or due the egress of a downstream stitched LSP segment starting to signal ELC. When this router becomes a notional egress, it reacts to the change as discussed above. When this router stops being a notional egress, this router stops performing the label operation described above. Instead, this router now starts to simply SWAP the top label.

A router may move the entropy label indicator and entropy label underneath a different LSP's transport label, to support hierarchical LSPs. Two ways to handle this issue are described below. First, the ingress LER may be open to configuration. A configuration option should exist by which an operator can disable the insertion of entropy label indicator and entropy label on a per-LSP basis. The specific level in the LSP hierarchy for which to enable this configuration may be based on operator knowledge based on knowledge of transit routers that need entropy label benefits, that is, those routers that have a multi-path (LAG or LSP ECMP) as egress interface. The level in the LSP hierarchy may also be based on label hashing abilities of such routers. Information about the specific number of labels in the label-stack that can be used in the hash computation; and any constraints about the position of the labels that can be used for computation when the label stack is larger than a certain ASIC-specific threshold.

An LER may also be capable of being configured to rewrite the label stack of an intrinsically-entropy-label-capable LSP. An operator will know the forwarding characteristics (with regards to the number of labels that can be included in the hash computation) of the transit routers across the path of the end-to-end LSP that is part of an LSP hierarchy. By making such a configuration, the operator can ensure that the entropy label will appear in the label stack such that all transit routers shall be able to include the as part of the hash computation The configuration would cause the label stack of the outgoing packet to have its extant entropy label indicator and entropy label removed, and an entropy label indicator and entropy label inserted just underneath the label of the LSP for which this ingress LER is setup to insert entropy label indicator and entropy label.

An LER may also prevent insertion of multiple entropy label indicators and entropy labels. At an ingress LER, the LER may avoid inserting an entropy label indicator and entropy label for an LSP if the packet already contains an entropy label indicator. This ensures that for a data packet on a hierarchy of LSPs, there will be only one instance of an entropy label indicator and entropy label. This may ensure that when multiple LSPs in an LSP hierarchy are intrinsically-entropy-label-capable, the entropy label indicator and entropy label will be inserted just underneath the transport label of the innermost LSP in the hierarchy. However, this disclosure describes a way by which to modify the level in the LSP hierarchy for which an entropy label indicator and entropy label is inserted.

Figure 2:
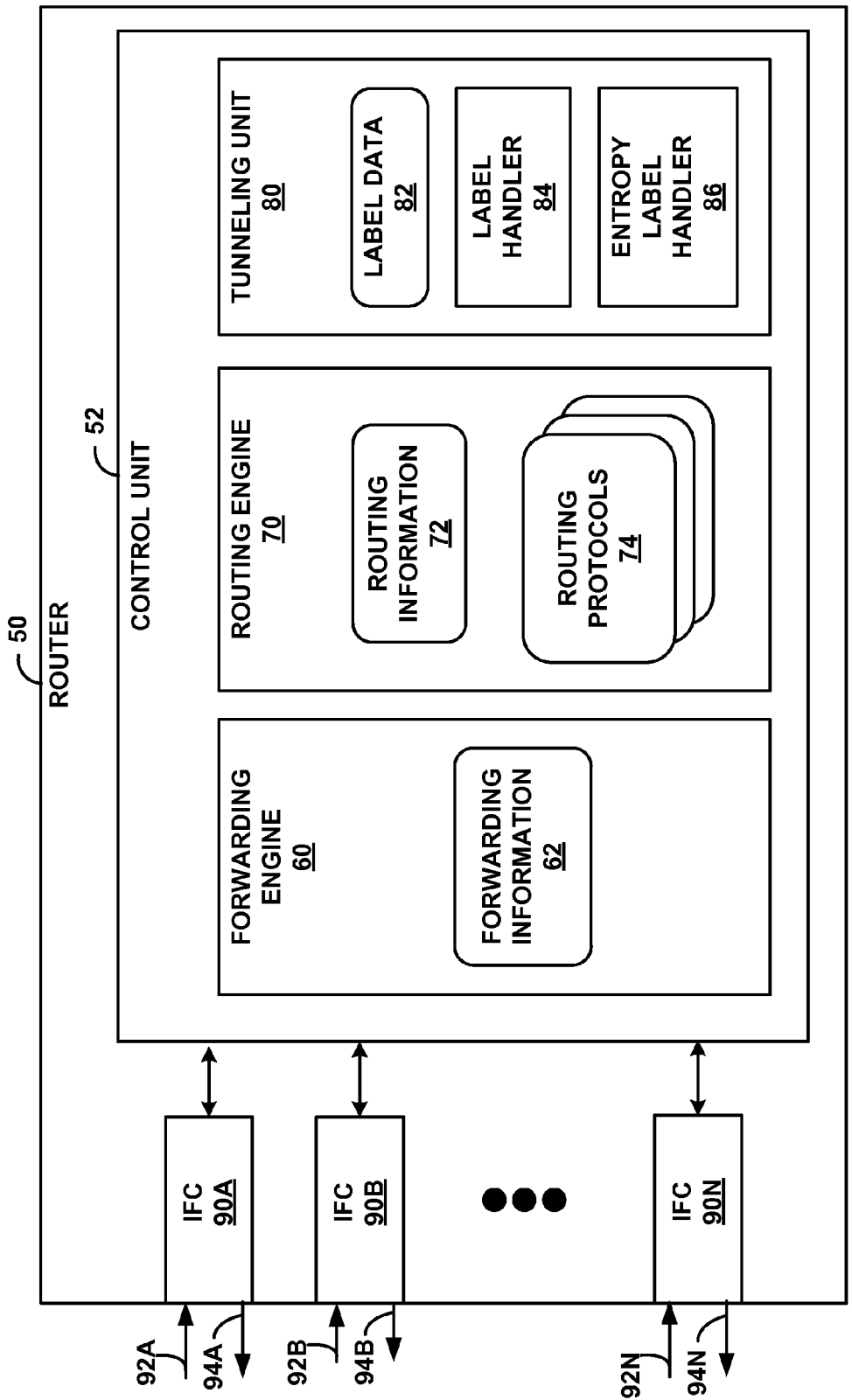
FIG. 2 is a block diagram illustrating an example router including a tunneling unit configured according to the techniques of this disclosure.

FIG. 2 is a block diagram illustrating an example router 50 including a tunneling unit 80 configured according to the techniques of this disclosure. Router 50 may correspond to a notional ingress router, a notional egress router, or a stitching point router, e.g., one of routers 20, 24, 28, and 32 in FIG. 1. In the example of FIG. 2, router 50 includes interface cards 90A-90N (IFCs 90), and control unit 52. Control unit 52 includes packet forwarding engine (PFE) 60, routing engine (RE) 40, and tunneling unit 80.

IFCs 90 receive data via respective inbound links 92A-92N (inbound links 92) and send data via outbound links 94A-94N (outbound links 94). Inbound links 92 and outbound links 94 in some examples form common, physical communication media for the IFCs, which operate in full duplex mode. That is, in some examples, each of IFCs 90 are coupled to respective communication media that can send and receive data substantially simultaneously. In other examples, inbound links 92 and outbound links 94 form separate physical media for respective IFCs 90.

Control unit 52 includes processing hardware and, in some examples, software and/or firmware executed by the processing hardware. In various examples, control unit 52 and the various elements thereof, e.g., PFE 60 and RE 70, are implemented in one or more processors, processing units, digital signal processors (DSPs), application specific integrated circuits (ASICs), field programmable gate arrays (FPGAs), or any combination thereof. When implemented in software or firmware, control unit 52 includes one or more processors or processing units for executing instructions for the software or firmware, as well as a computer-readable storage medium for storing the instructions. In some examples, elements of PFE 60 and RE 70 are implemented in discrete units or modules, while in other examples, PFE 60 and RE 70 are functionally integrated.

RE 70 includes instructions for one or more routing protocols 74. Routing protocols 74 include any or all of interior gateway routing protocols such as open shortest path first (OSPF), intermediate system to intermediate system (IS-IS), routing information protocol (RIP), interior gateway routing protocol (IGRP), enhanced IGRP (EIGRP), and/or exterior gateway routing protocols, such as border gateway protocol (BGP). In general, interior gateway routing protocols are used to exchange routing information between routers of an autonomous system. Routing protocols 74 further include protocols related to network tunneling, such as MPLS, label distribution protocol (LDP), resource reservation protocol traffic engineering (RSVP-TE), or other protocols.

In general, RE 70 executes routing protocols 74 to determine routes between network devices, e.g., routes from router 50 to other network devices. Other routers coupled to router 50 via IFCs 90 advertise routes to router 50. When router 50 receives a communication from another router that advertises a new route, RE 70 receives the communication and stores the new route in routing information 42 (also referred to as a routing information base). RE 70 also executes routing protocols 74 to prioritize routes from router 50 to a destination. That is, when routing information 42 includes information indicating that multiple routes exist to a common destination, RE 70 executes routing protocols 74 to select one of the routes to reach the destination.

The selected route to reach the destination generally includes an indication of a "next hop" along the route to reach the destination. This next hop typically corresponds to a network device, such as, for example, another router, switch, gateway, or other network device along the route to reach the destination. The next hop device is connected to router 50 via one of IFCs 90. Accordingly, using the selected route to reach a destination, control unit 52 can determine the one of IFCs 90 connected to the next hop along the route to the destination and update forwarding information stored by PFE 60 to indicate the one of IFCs 90 to which to send packets destined for the destination.

More specifically, PFE 60 maintains forwarding information base (FIB) 62. Then, in response to receiving information from routing engine 40, PFE 60 updates FIB 62 to map a destination address to one of IFCs 90, based on the next hop along the route to reach the destination address. FIB 62 also includes information indicating how to forward packets associated with a network tunnel, e.g., packets having one or more labels and/or packets to which to append one or more labels.

When router 50 acts as an ingress router for a tunnel (e.g., an LSP), router 50 receives a packet via one of ingress links 92 for one of IFCs 90. In general, IFCs 90 are configured to send such a packet to forwarding engine 60. Forwarding engine 60 determines the source device from which the packet was received based on the one of IFCs 90 that received the packet and the port of the one of IFCs 90 that received the packet. In some examples, forwarding engine 60 also determines the destination of the packet. In any case, forwarding engine 60 determines, using forwarding information 62, that the packet is to be tunneled, and therefore, sends the packet to tunneling unit 80. It should be understood that router 50 may also be configured to receive and process conventional network packets, e.g., packets not associated with a tunnel.

Tunneling unit 80 includes label data 82, label handler 84, and entropy label handler 86. Label data 82 represents data for labels that can be appended to a received packet, as well as data for handling a packet having labels already appended. For example, when router 50 acts as an ingress router for a tunnel, label handler 84 receives the packet and determines a tunnel to which the packet is to be sent. Label handler 84 also determines, based on information received for the packet, a pair of edge routers for the packet and network layer services to be applied to the packet. Label handler 84 then determines, using label data 82, labels representing the pair of edge routers, the network layer services, and a label for the tunnel representative of the next hop along the tunnel.

Entropy label handler 86, in accordance with the techniques of this disclosure, determines whether a label stack includes an entropy label identifier and an entropy label, removes the entropy label identifier and entropy label in certain circumstances, adds the entropy label identifier in other cases, and moves the entropy label identifier and entropy label up or down in the label stack in still other cases. To determine appropriate label handling behavior, tunneling unit 80 determines whether router 50 is positioned between two segments of an end-to-end LSP. Assuming that router 50 is positioned between two segments of an end-to-end LSP, tunneling unit 80 then determines whether either or both of these segments is entropy label capable.

For instance, when tunneling unit 80 determines that a packet of an end-to-end LSP is received from an incoming segment, which is entropy label capable, and that is destined for an outgoing segment, which is not entropy label capable, tunneling unit 80 determines that entropy labels in a label stack of the packet should be removed. Thus, entropy label handler 86 inspects the label stack of the packet to determine whether the label stack includes an entropy label indicator and an entropy label. If the label stack includes an entropy label indicator and an entropy label, entropy label handler 86 removes the entropy label indicator and entropy label. This may occur after label handler 84 removes an incoming label for the incoming segment, and before label handler 84 adds an outgoing label for the outgoing segment.

As another example, when tunneling unit 80 determines that a packet of an end-to-end LSP is received from an incoming segment, which is not entropy label capable, and that is destined for an outgoing segment, which is entropy label capable, tunneling unit 80 determines that an entropy label should be added to a label stack for the packet. Thus, entropy label handler 86 adds an entropy label indicator and an entropy label to the label stack for the packet. This may occur after label handler 84 removes an incoming label for the incoming segment, and before label handler 84 adds an outgoing label for the outgoing segment.

As yet another example, when tunneling unit 80 determines that a packet of an end-to-end LSP is received from an incoming segment, which is entropy label capable, and that is destined for an outgoing segment, which is also entropy label capable, tunneling unit 80 determines that a label stack for the packet should include an entropy label. However, it may be the case that the label stack does not already include an entropy label. In this case, entropy label handler 86 determines whether the label stack for the packet includes an entropy label, and if not, adds an entropy label indicator and the entropy label to the label stack. Again, this may occur after label handler 84 removes an incoming label for the incoming segment, and before label handler 84 adds an outgoing label for the outgoing segment. When a label stack for a packet includes an entropy label, a component of router 50 (e.g., forwarding engine 60) may calculate a hash on the label stack to determine an equal-cost multi-path (ECMP) path for a next segment of an end-to-end LSP.

In some cases, e.g., where the packet is tunneled through a hierarchical LSP, the entropy label may be below two or more labels in the label stack when the packet is received. Thus, to determine whether the packet includes an entropy label, entropy label handler 86 may inspect up to the entire label stack. Likewise, as explained above with respect to FIG. 1, in some cases, entropy label handler 86 is configured to reposition the entropy label indicator and entropy label within the label stack.

In this manner, router 50 represents an example of a stitching point routing device that stitches a previous segment of an end-to-end label-switched path (LSP) to a next segment of the end-to-end LSP, the stitching point routing device including one or more network interfaces configured to receive packets via the previous segment and send packets via the next segment, and one or more processors configured to determine whether the next segment supports entropy labels, determine whether a packet received from the previous segment is encapsulated by a label stack including an entropy label, when the next segment does not support entropy labels and when the packet is encapsulated by the label stack including the entropy label, remove the entropy label from the label stack, when the next segment supports entropy labels and when the packet is not encapsulated by the label stack including the entropy label, add an entropy label to the label stack, and forward the packet along the next segment.

Figure 3:
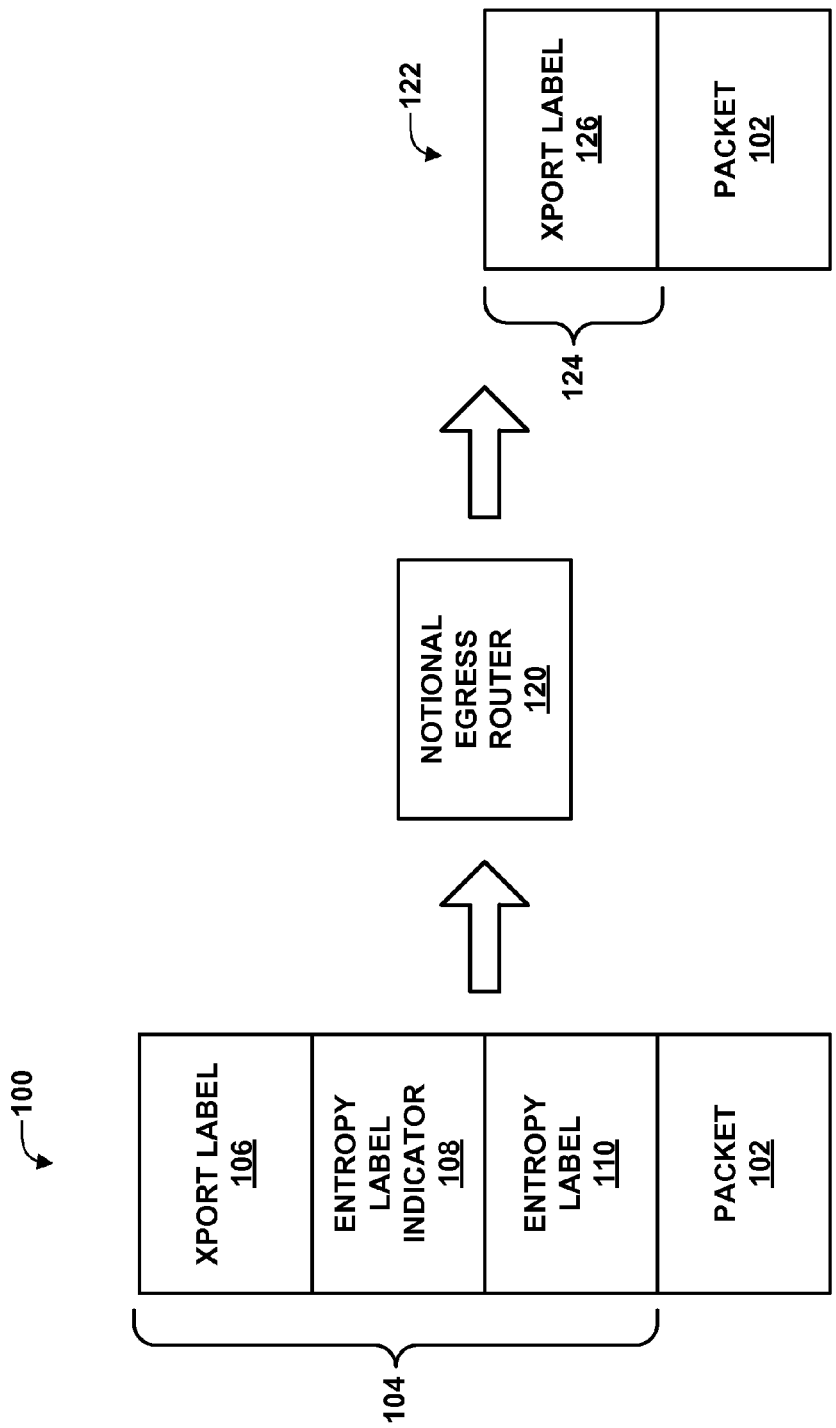
FIG. 3 is a conceptual diagram illustrating an example encapsulated packet received from an entropy label capable segment of an end-to-end LSP that is to be output to a non-entropy label capable segment of the end-to-end LSP.

FIG. 3 is a conceptual diagram illustrating an example encapsulated packet 100 received from an entropy label capable segment of an end-to-end LSP that is to be output to a non-entropy label capable segment of the end-to-end LSP. In this example, encapsulated packet 100 includes packet 102 and label stack 104. Label stack 104 includes transport (xport) label 106, entropy label indicator 108, and entropy label 110. Notional egress router 120, which may include components similar to those of router 50 illustrated in FIG. 2, may modify encapsulated packet 100 in accordance with the techniques of this disclosure, based on the entropy label capabilities of the segments of the end-to-end LSP.

In this example, notional egress router 120 determines that the next segment of the end-to-end LSP is not entropy label capable, as discussed above. Therefore, after removing transport label 106, corresponding to the previous segment, notional egress router 120 also removes entropy label indicator 108 and entropy label 110. Notional egress router 120 then adds transport label 126, corresponding to the next segment of the end-to-end LSP. In this manner, a revised label stack 124 includes transport label 126, but does not include an entropy label indicator or an entropy label. Notional egress router 120 thereby forms encapsulated packet 122 that does not include an entropy label.

It should be understood that additional labels may be included in label stacks 104, 124 that are not shown in FIG. 3. Similarly, in the examples of FIGS. 4 and 5 as discussed below, the full label stack is not necessarily illustrated in the figures. However, FIG. 3 illustrates an example in which label stack 124 no longer includes an entropy label or an entropy label indicator, based on the determination of notional egress router 120 that the next segment (that is, the outgoing segment) of the end-to-end LSP is not entropy label capable.

Figure 4:
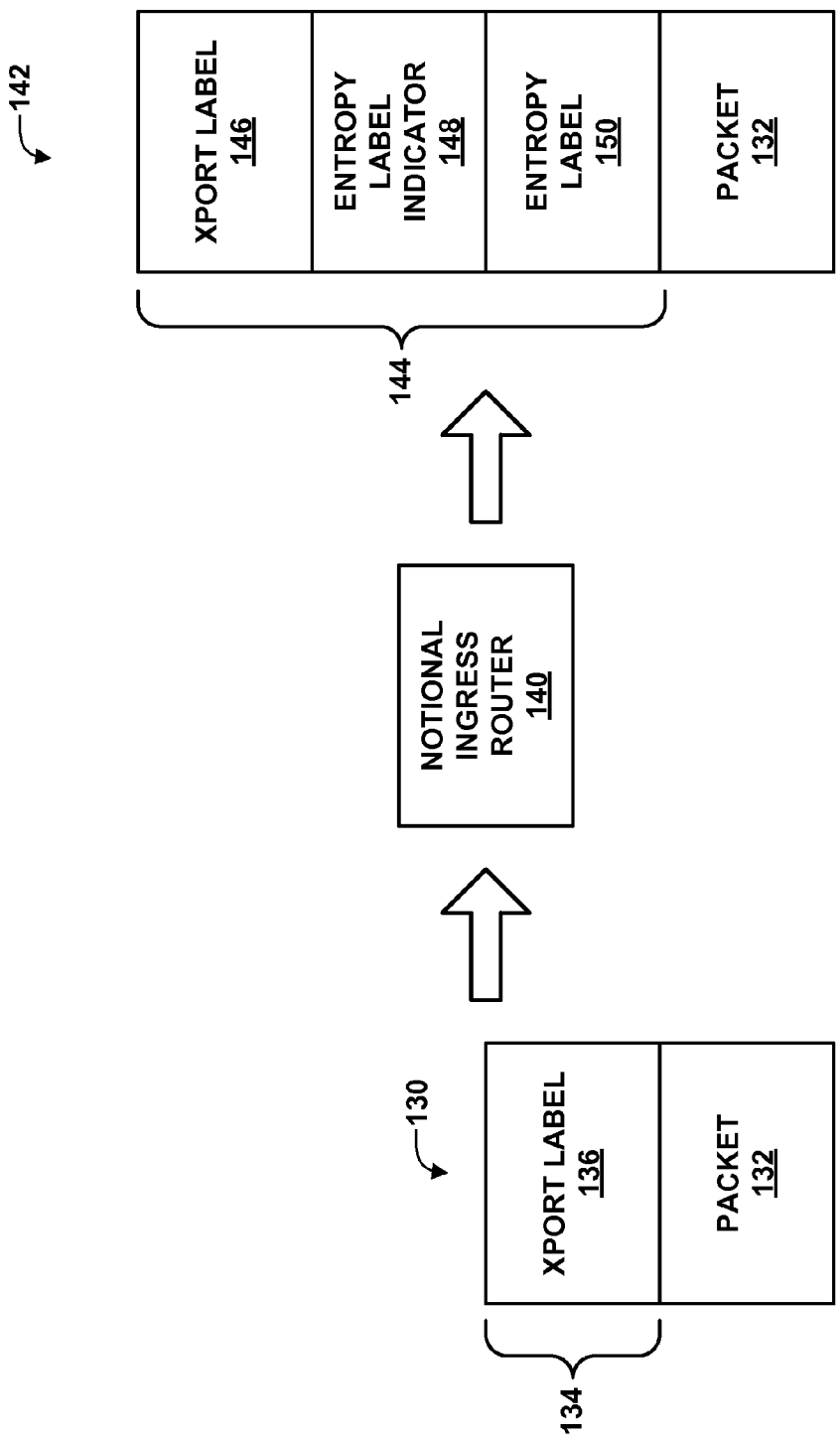
FIG. 4 is a conceptual diagram illustrating an example encapsulated packet, which is modified to add an entropy label when an outgoing segment is entropy label capable.

FIG. 4 is a conceptual diagram illustrating an example encapsulated packet 130, which is modified to add an entropy label when an outgoing segment is entropy label capable. In this example, encapsulated packet 130 includes transport label 136 and packet 132. Thus, label stack 134 includes transport label 136. Notional ingress router 140 may receive encapsulated packet 130 from a non-entropy label capable segment of an end-to-end LSP. Alternatively, notional ingress router 140 may receive encapsulated packet 130 from an entropy label capable segment of an end-to-end LSP that for whatever reason does not currently include an entropy label.

Based on a determination that the outgoing segment is entropy label capable, notional ingress router 140 removes transport label 136, adds entropy label indicator 148 and entropy label 150, then adds transport label 146, which corresponds to the outgoing segment. Thus, the revised encapsulated packet 142 is encapsulated by label stack 144, which includes an entropy label indicator and an entropy label. Again, adding entropy label indicator 148 and entropy label 150 may be based on a determination, by notional ingress router 140, that the incoming segment of the end-to-end LSP was not entropy label capable, and/or a determination that encapsulated packet 130 did not include an entropy label.

Figure 5:
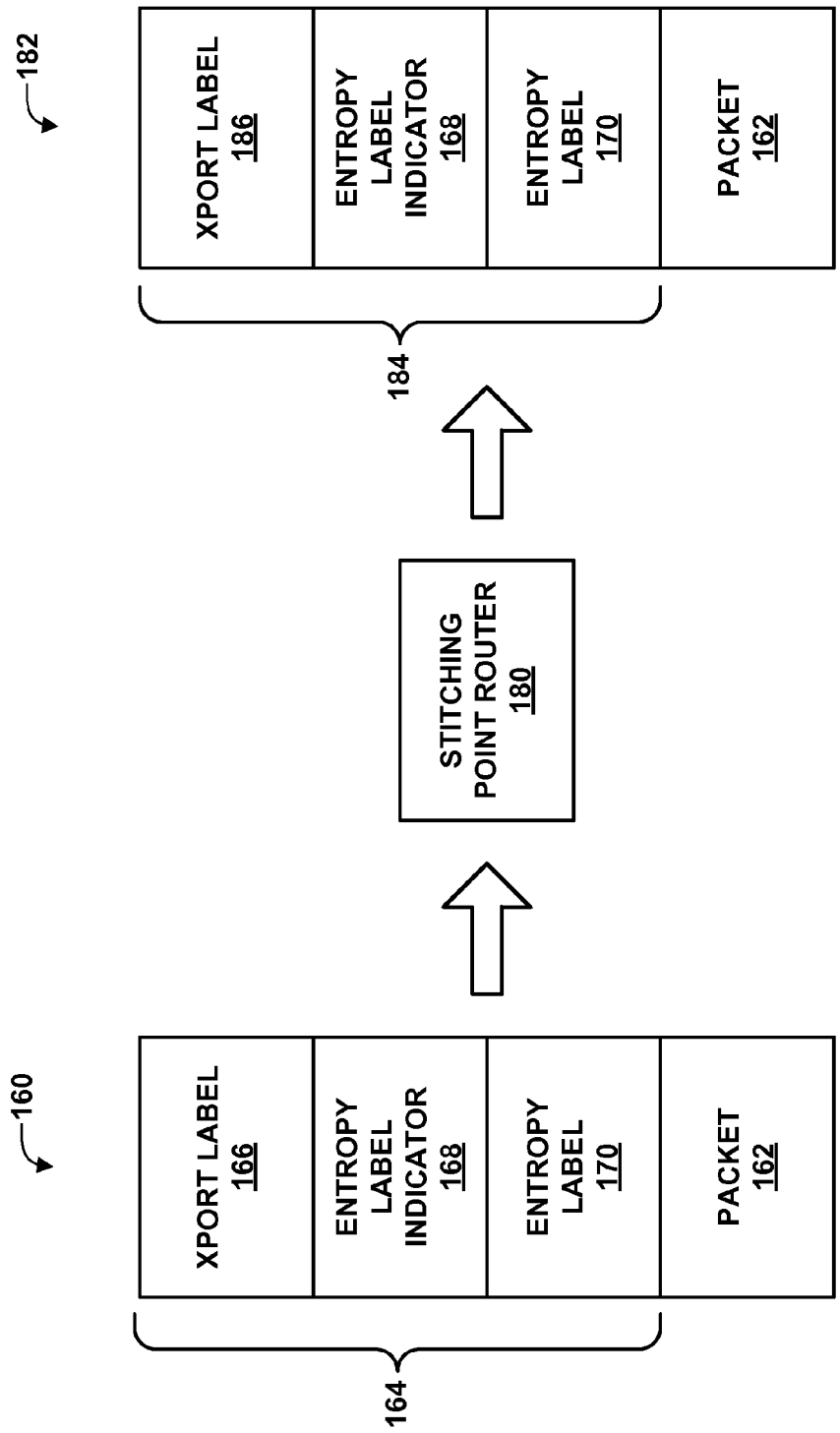
FIG. 5 is a conceptual diagram illustrating an example in which a stitching point router receives an encapsulated packet from an entropy label capable segment and outputs modified encapsulated packet to an entropy label capable segment.

FIG. 5 is a conceptual diagram illustrating an example in which stitching point router 180 receives encapsulated packet 160 from an entropy label capable segment and outputs modified encapsulated packet 182 to an entropy label capable segment. In the example of FIG. 5, encapsulated packet 160 includes packet 162 that is encapsulated by label stack 164.

Label stack 164 includes transport label 166, entropy label indicator 168, and entropy label 170.

Based on a determination that the outgoing segment is also entropy label capable, stitching point router 180 simply removes transport label 166 from the label stack, and after determining the presence of entropy label indicator 168 and entropy label 170, adds transport label 186 to the label stack. Stitching point router 180 thereby forms modified encapsulated packet 182 including label stack 184, which includes transport label 186. Notably, label stack 184 also includes entropy label indicator 168 and entropy label 170, which are the same as corresponding labels in label stack 164. That is, the same entropy label indicator 168 and entropy label 170 are included in both label stack 164 and label stack 184. Thus, the same entropy label indicator and entropy label may be used when a packet traverses two distinct segments of an end-to-end LSP.

Figure 6:
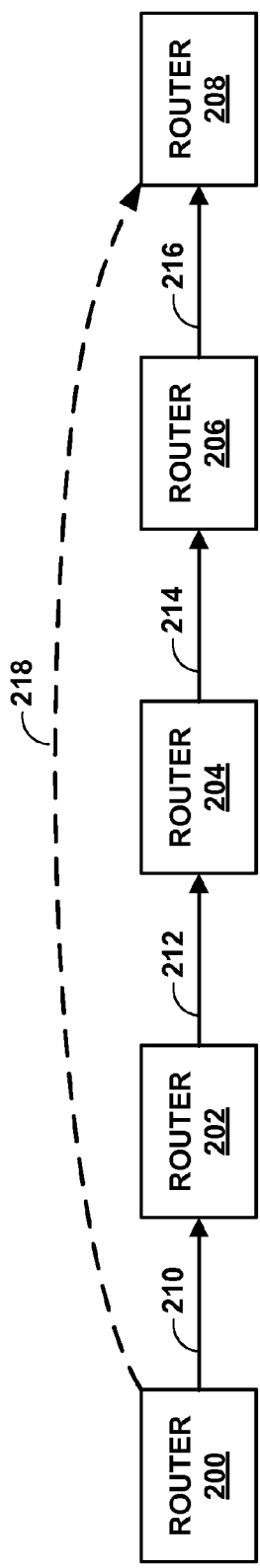
FIG. 6 is a block diagram illustrating an example set of routers forming an end-to-end LSP.

FIG. 6 is a block diagram illustrating an example set of routers 200-208 forming end-to-end LSP 218. In particular, routers 202-206 represent stitching point routers, while router 200 represents an ingress to end-to-end LSP 218 and router 208 represents an egress from end-to-end LSP 218. Router 200 is communicatively coupled to router 202 via segment 210, which may include additional network elements (e.g., label switch routers (LSRs)). Similarly, segment 212 connects router 202 to router 204, segment 214 connects router 204 to router 206, and segment 216 connects router 206 to router 208. Like segment 210, segments 212, 214, 216 may include additional network elements that are not illustrated in FIG. 6.

In the topology of FIG. 6, for an end-to-end LSP from router 200 to router 208, segments 212 and 216 could be intrinsically entropy label capable, while the segments 210 and 214 may be non-entropy label capable. For data traffic going over LSP 218 from router 200 to router 208, using entropy labels on segments 212 and 216 may be beneficial for load-balancing over LAGs/ECMP.

To cater for an incremental deployment of intrinsically-entropy label capable routers in a network, the multiple different modes for entropy label use with LSP stitching need to be to be supported. The spectrum of supported behaviors are listed below by reference to FIG. 6. Segments 210, 212, 214, and 216 are between routers (e.g., label edge routers (LERs)) 200, 202, 204, 206, and 208, respectively. There may or may not be other routers between the per-segment ingress<->egress LERs. The transport LSP signaling protocol could be any of a variety of signaling protocols, such as LDP/RSVP/BGP-LU tunneled over RSVP/LDP, or the like.

Each of segments 210-216 may have its own independent entropy label capability based on BOTH the per-segment ingress having the ability to insert the entropy label and the per-segment egress (or penultimate hop router) having the ability to strip the entropy label. This is very similar to RFC 6790, with an additional data-plane rule described above with respect to FIG. 1.

Per-segment entropy labels may be attractive for certain use scenarios. For instance, there is an opportunity to get benefits on those segments where entropy label benefits are available. Even though the end-to-end LSP may not support entropy label capabilities, this allows the entropy label benefits on those segments that are EL-capable. In the case of stitched LSPs, it is useful to insert entropy labels at the first per-segment ingress LER (per-segment ingress LER closest to the end-to-end ingress LER) that has the ability to insert the entropy label. It is also useful to carry the entropy label on the data packets as far along the stitched LSP as the last per-segment egress LER that ability to strip the entropy label on a series of contiguous entropy label supporting segments.

There may be benefits to using entropy labels with notional-segment LSPs. An operator might be able to use entropy labels for the MPLS traffic on its path to a stitching point even though the stitching-point router (or its penultimate hop router) itself may not have the data-plane capabilities required as in RFC 6790. Additionally, even if the stitching-point (or its penultimate hop router) do have the data-plane capabilities of RFC 6790, it is generally more efficient to forward the data packets without having to strip the entropy label and then reinsert the entropy label when the downstream segment is also intrinsically entropy label capable. This corresponds to having the notional-LSP and the end-to-end LSP being the same LSP.

Figure 7:
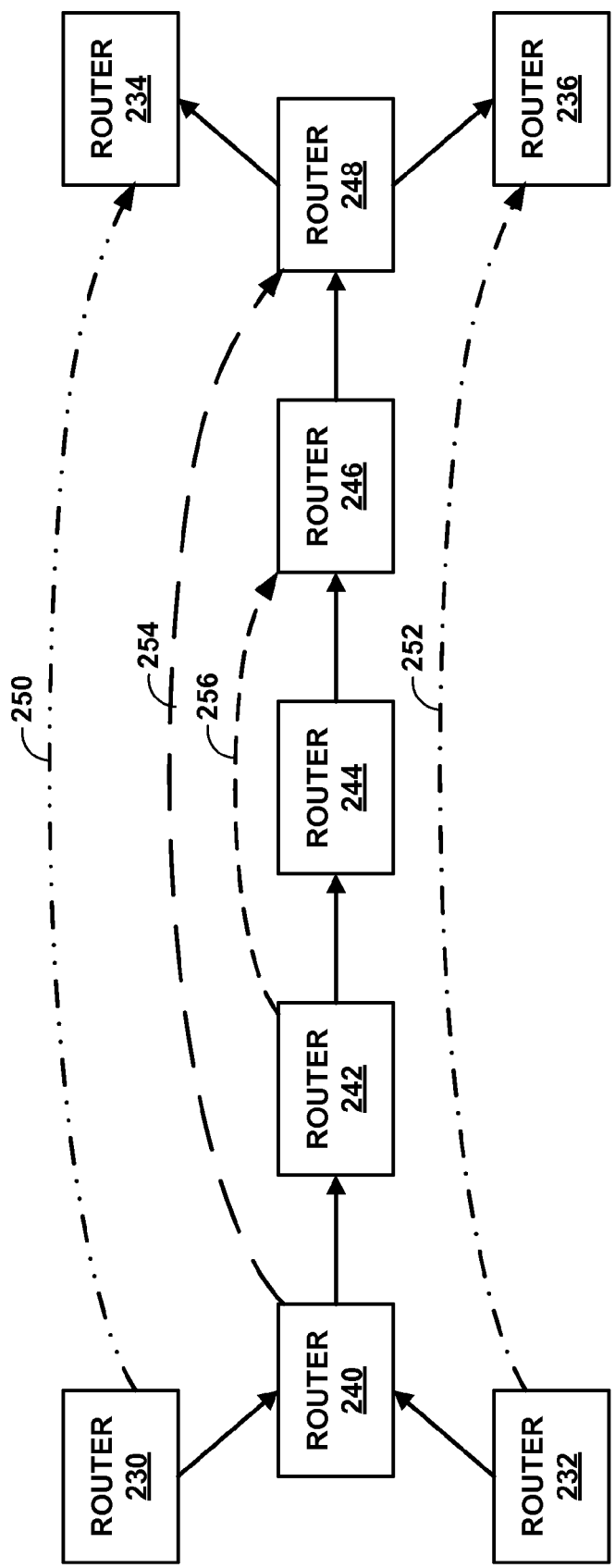
FIG. 7 is a block diagram illustrating example LSP hierarchies, and how the techniques of this disclosure may be used in the context of hierarchical LSPs.

FIG. 7 is a block diagram illustrating example LSP hierarchies, and how the techniques of this disclosure may be used in the context of hierarchical LSPs. In the example of FIG. 7, router 230 is communicatively coupled with router 234 via an LSP 250, and router 232 is communicatively coupled with router 236 via an LSP 252. In this example, routers 240-248 (representing respective stitching point routers, ingress routers, and egress routers) participate in the formation of LSPs 250,252. Furthermore, in the example of FIG. 7, LSP 254 extends from router 240 to router 248, and LSP 256 extends from router 242 to router 246.

Thus, a packet sent from router 230 to router 234 via LSP 250 may be in up to three LSPs at various hierarchical levels, in the example of FIG. 7. Furthermore, FIG. 7 illustrates that the same transport LSP may be used to transport packets of two or more distinct external LSPs. For instance, in the example of FIG. 7, traffic for both LSP 250 and LSP 252 is directed along LSP 254.

FIG. 7 is presented for the purpose of highlighting the problem to be addressed and the resultant requirements to be met in the case of LSP hierarchies. Let there be an LSP hierarchy with the ingress for the different levels of LSP hierarchy being at different routers, such that each LSP in the hierarchy is intrinsically entropy label capable. The individual LSPs in the hierarchy could be a single-segment LSP or a stitched end-to-end LSP.

In the above topology, let there be the following LSPs: LSP 256 from router 242 to router 246; LSP 254 from router 240 to router 248, tunneled through LSP 256; LSP 250 from router 230 to router 234, tunneled through LSP 254; and LSP 252 from router 232 to router 236, also tunneled through LSP 254. All of the LSPs above are assumed to be intrinsically entropy label capable, in this example.

Even though the aim of using entropy label is to get better load-balancing support, in some cases, the insertion of entropy label indicator and entropy label may unnecessarily reduce the effective payload of an LSP.

In the example of FIG. 7, as per RFC 6790 for a data packet on LSP 250, the insertion of entropy label indicator and entropy label for each of three LSPs (LSPS 250, 254, 256) is not explicitly prohibited. As a result, it is possible that the packet on LSP 250, might end up with three entropy label indicators and three entropy labels (one for each LSP level in the hierarchy), thus reducing the effective payload of LSP 250. Likewise for LSP 252, the presence of the entropy label indicator and entropy label for the outer LSPs 256 and 254 is not strictly useful for load-balancing the data traffic on the LSPs 250 and 252.

One example solution for this issue relies on inserting the entropy label indicator and entropy label in the context of only one LSP in a hierarchy. This issue results in the following requirement for entropy label usage in the presence of LSP hierarchies. First, there is a desirability of having a single entropy label indicator and entropy label on data packets over an LSP hierarchy: The LSP for which the entropy label indicator and entropy label is inserted, is preferably the innermost intrinsically EL-capable LSP, as the notion of a user-flow is more specifically indicated by fields deeper inside the packet headers. Having an entropy label be present deeper in the packet provides load-balancing benefits of entropy label for the traversal of the packet across a longer stretch of the network. If there is to be only one entropy label indicator and one entropy label in the label stack, it imposes an additional data plane requirement on the ingress LER as described above with respect to FIG. 1.

Even though the aim of using entropy label is to get better load-balancing, in some cases the insertion of entropy label indicator and entropy label may actually offer no load-balancing benefits at all. Whether the presence of an entropy label offers load-balancing benefits on a given transit router, depends on whether the transit router has a LAG or an ECMP as an outgoing interface for the LSP, and whether the forwarding ASICs of the transit routers have the ability to include the entropy label (appearing at a specific position in the label stack) in the hash computation, either by looking up the entropy label indicator and then picking the entropy label, or computing the hash on the maximum number of labels that it can pick from the label-stack for hash-computation, which happens to also include the entropy label.

When the entropy label on a packet is outside the portion-of-the-label-stack that the ASIC of a transit router can use for hash computation, the forwarding hardware may include only the top few labels or the bottom few labels in the hash computation. This may prevent the inclusion of the entropy label for hash-computation. In example of FIG. 7, for a data packet going over LSP 250, router 230 may insert the entropy label indicator and entropy label underneath the label for LSP 250, and none of the other routers need insert an entropy label indicator and entropy label. When this data packet arrives at router 244, its label stack includes, from highest to lowest in the stack, a label for LSP 256, a label for LSP 254, a label for LSP 250, an entropy label indicator, and an entropy label.

Suppose that router 244 is able to include only the top four labels of a label stack for hash-computation for ECMP, due to the ability of its forwarding ASICs. So, the router 244 is not able to get the benefit of the presence of the entropy label in the data packet. If the only ECMP/LAG in this network is the link between routers 244 and 246, then the presence of the entropy label serves no purpose for the above network example, and it ends up reducing the payload capacity of the LSPs 250 and 252 by 8 bytes.

This example could be further generalized in the case of seamless MPLS, where there may be deeper LSP hierarchies. A transit router that has the ability to hash on an entropy label (based on its depth in the label stack) does not have multiple paths; while another router that has multiple paths and the ability hash on the entropy label (appearing at a specific depth in the label stack) is unable to do so, as the entropy label appears outside the depth of the label stack that may be included in the hash. In neither of the foregoing cases is the presence of an entropy label helpful.

This translates into a requirement for the entropy label, regarding flexibility in the choice of LSP tunnel for which the entropy label is inserted. There is a need to have a way by which to include an entropy label underneath a specific label in a label-hierarchy based on it serving the most useful purpose (i.e. taking into consideration location of multiple forwarding-paths and stack-depth-concerns). RFC 6790 has no way of influencing the insertion of entropy label indicator and entropy label at a certain LSP level in the stack. Thus, there is a need for a mechanism by which one of the many intrinsically-entropy-label-capable LSPs in an LSP hierarchy could be picked for inserting the entropy label indicator and entropy label.

In accordance with the techniques of this disclosure, a stitching point router may modify the label stack such that the entropy label appears no deeper than a "maximum depth" in the label stack, where the maximum depth is the maximum depth of label that is included in the hash, for example. If the entropy label is below the maximum depth, a stitching point router may move the entropy label (and entropy label indicator) up the stack to a higher position no deeper than the maximum depth. Additionally or alternatively, a stitching point router may move a label up or down the label stack based on whether an LSP for a transport label (underneath which the label is being moved to) is entropy label capable. If the label stack does not already include an entropy label, the stitching point router may add the entropy label such that the entropy label is at a position in the label stack no deeper than the maximum depth.

Figure 8:
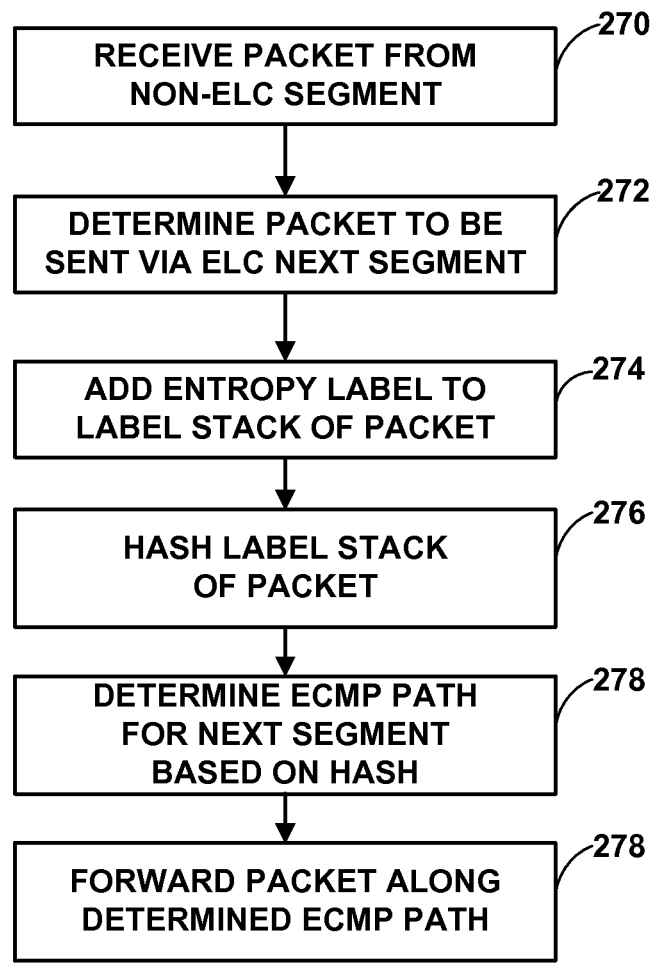
FIG. 8 is a flowchart illustrating an example method for adding an entropy label to a label stack for a packet.

FIG. 8 is a flowchart illustrating an example method for adding an entropy label to a label stack for a packet. The method of FIG. 8 may be performed by any of the various stitching point routing devices described above, or by a notional ingress router. For purposes of example, the method of FIG. 8 is described with respect to router 50 of FIG. 2.

Initially, router 50 receives a packet from a non-entropy label capable (ELC) segment of an end-to-end LSP (270). Router 50 then determines that the packet is to be sent via an ELC next segment (272). Accordingly, router 50 adds an entropy label to the label stack of the packet (274). Router 50 then calculates a hash of the label stack of the packet, including the entropy label (276). Thus, router 50 determines an equal-cost multi-path (ECMP) path for the next segment based on the hash (278). Router 50 then forwards the packet along the determined ECMP path (278).

In this manner, the method of FIG. 8 represents an example of a method including determining, by a notional ingress routing device, whether a packet, received from a previous segment of an end-to-end label-switched path (LSP) for the packet, is encapsulated by a label stack that includes an entropy label, wherein the notional ingress routing device comprises a routing device of a current segment of the end-to-end LSP, when the current segment supports entropy labels and the label stack does not include an entropy label, adding an entropy label to the label stack of the packet, and forwarding the packet along the current segment.

Figure 9:
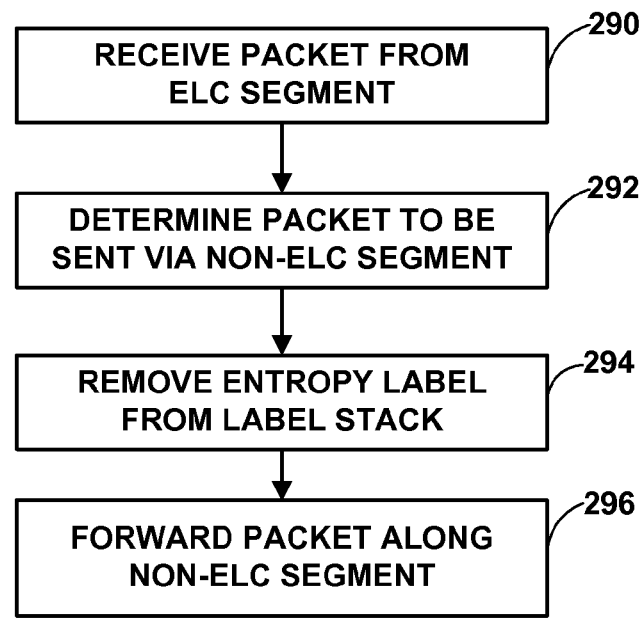
FIG. 9 is a flowchart illustrating an example method for removing an entropy label from a label stack for a packet.

FIG. 9 is a flowchart illustrating an example method for removing an entropy label from a label stack for a packet. The method of FIG. 9 may be performed by any of the various stitching point routing devices described above, or by a notional egress router. For purposes of example, the method of FIG. 9 is described with respect to router 50 of FIG. 2.

Initially, router 50 receives a packet from an entropy label capable (ELC) segment of an end-to-end LSP (290). Router 50, in this example, then determines that the packet is to be sent via a non-ELC segment (292). For instance, forwarding information 62 may specify that the packet is to be sent via a non-ELC segment, such that forwarding engine 60 may determine, using forwarding information 62, determines that the packet is to be sent via a non-ECL segment. Based on this determination, assuming the label stack of a packet includes an entropy label, router 50 removes the entropy label from the label stack (294). Router 50 then forwards the packet along the non-ELC segment (296).

In this manner, the method of FIG. 9 represents an example of a method including determining, by a notional egress routing device, whether a next segment of an end-to-end label-switched path (LSP) for a packet, encapsulated by a label stack including an entropy label, supports entropy labels, wherein the notional egress routing device comprises a routing device of a current segment of the end-to-end LSP, when the next segment does not support entropy labels, removing the entropy label from the label stack of the packet, and forwarding the packet along the end-to-end LSP.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

The invention claimed is:

1. A method comprising:
  determining, by a notional egress routing device, whether a next label switched path (LSP) segment of an end-to-end LSP for a packet, encapsulated by a label stack including an entropy label, supports entropy labels, wherein the notional egress routing device comprises a routing device of a current LSP segment of the end-to-end LSP, and wherein the next LSP segment includes a plurality of routing devices;
  when the plurality of routing devices of the next LSP segment does not support entropy labels;
    removing the entropy label from the label stack of the packet; and
    forwarding the packet, from which the entropy label has been removed, along the end-to-end LSP; and
  when the plurality of routing devices of the next LSP segment supports entropy labels, forwarding the packet, including the entropy label, along the end-to-end LSP.

2. The method of claim 1, wherein forwarding comprises forwarding the packet to a subsequent routing device of the current LSP segment.

3. The method of claim 1, wherein forwarding comprises forwarding the packet to a routing device of the plurality of routing devices of the next LSP segment of the end-to-end LSP.

4. The method of claim 1, wherein the label stack further includes an entropy label indicator that indicates the presence of the entropy label, the method further comprising, when the plurality of routing devices of the next LSP segment does not support entropy labels, removing the entropy label indicator from the label stack of the packet.

5. The method of claim 1, further comprising removing an incoming label of the label stack, wherein the incoming label corresponds to the current LSP segment, and wherein the incoming label is different than the entropy label.

6. The method of claim 5, further comprising, after removing the incoming label, adding an outgoing label to the label stack, wherein the outgoing label corresponds to the next LSP segment.

7. The method of claim 1, further comprising sending a message along the current LSP segment indicating that the notional egress routing device is capable of removing entropy labels.

8. The method of claim 1, further comprising, when the plurality of routing devices of the next LSP segment supports entropy labels, modifying the label stack such that the entropy label is at a position in the label stack that is no deeper than a maximum depth for the entropy label.

9. The method of claim 1, wherein the notional egress routing device comprises a routing device that removes entropy labels from packets of one or more LSP segments for one or more end-to-end LSPs.

10. A method comprising:
  determining, by a notional ingress routing device, whether a packet, received from a previous label switched path (LSP) segment of an end-to-end LSP for the packet, is encapsulated by a label stack that includes an entropy label, wherein the notional ingress routing comprises a routing device of a current LSP segment of the end-to-end LSP, wherein the current LSP segment includes a plurality of routing devices;
  when the current LSP segment supports entropy labels and the label stack does not include an entropy label;
    adding an entropy label to the label stack of the packet; and
    forwarding the packet including the entropy label along the current LSP segment; and
  when the current LSP segment does not support entropy labels, forwarding the packet without the entropy label along the current LSP segment.

11. The method of claim 10, wherein when the current LSP segment supports entropy labels and the label stack does not include the entropy label, the method further comprises adding an entropy label indicator to the label stack of the packet.

12. The method of claim 10, further comprising receiving a message from a notional egress routing device of the current LSP segment indicating that the notional egress routing device is capable of removing entropy labels.

13. The method of claim 10, wherein when the notional ingress routing device comprises a notional egress routing device for the previous LSP segment, the method further comprises
removing an incoming label from the label stack, wherein the incoming label corresponds to the previous LSP segment; and
after removing the incoming label, adding an outgoing label to the label stack above the entropy label, wherein the outgoing label corresponds to the current LSP segment.

14. The method of claim 10, wherein when the current LSP segment supports entropy labels and when the label stack includes the entropy label, the method further comprises avoiding adding a second, different entropy label to the label stack.

15. The method of claim 10, further comprising, prior to forwarding the packet, determining an equal-cost multi-path (ECMP) path of the next LSP segment along which to forward the packet based at least in part on a hash calculated on the label stack for the packet.

16. The method of claim 10, wherein adding the entropy label comprises adding the entropy label at a position in the label stack that is no deeper than a maximum depth for the entropy label.

17. The method of claim 10, wherein the notional ingress routing device comprises a routing device that adds entropy labels to packets of one or more LSP segments for one or more end-to-end LSPs.

18. A stitching point routing device that stitches a previous label switched path (LSP) segment of an end-to-end LSP to a next LSP segment of the end-to-end LSP, the stitching point routing device comprising:
one or more network interfaces configured to receive packets via the previous LSP segment and send packets via the next LSP segment, wherein the next LSP segment includes a plurality of routing devices; and
one or more processors configured to:
determine whether the plurality of routing devices of the next LSP segment supports entropy labels,
determine whether a packet received from the previous LSP segment is encapsulated by a label stack including an entropy label,
when the plurality of routing devices of the next LSP segment does not support entropy labels and when the packet is encapsulated by the label stack including the entropy label, remove the entropy label from the label stack,
when the plurality of routing devices of the next LSP segment supports entropy labels and when the packet is not encapsulated by the label stack including the entropy label, add an entropy label to the label stack, and
forward the packet along the next LSP segment.

19. The stitching point routing device of claim 18, wherein the one or more processors are configured to add the entropy label to the label stack at a position that is no greater than a maximum depth for the entropy label.

20. The stitching point routing device of claim 18, wherein when the plurality of routing devices of the next LSP segment supports entropy labels and when the packet is encapsulated by the label stack including the entropy label, the one or more processors are configured to modify the label stack such that the entropy label is at a position that is no greater than a maximum depth for the entropy label.

21. The stitching point routing device of claim 18, wherein the one or more processors are further configured to receive a first message from a notional egress routing device of the next LSP segment that indicates that the notional egress routing device is capable of removing entropy labels, and based at least in part on the first message, send a second message along the previous LSP segment indicating that the switching point routing device is capable of receiving packets encapsulated by label stacks including entropy labels.

22. The stitching point routing device of claim 18, wherein the one or more processors are further configured to, when the label stack further includes an entropy label indicator that indicates the presence of the entropy label and when the plurality of routing devices of the next LSP segment does not support entropy labels, remove the entropy label indicator from the label stack of the packet.

23. The stitching point routing device of claim 18, wherein the one or more processors are further configured to, when the label stack does not include the entropy label and when the plurality of routing devices of the next LSP segment supports entropy labels, add an entropy label indicator to the label stack of the packet.

24. The stitching point routing device of claim 18, wherein the one or more processors are further configured to remove an incoming label, corresponding to the previous LSP segment, from the label stack of the packet, and to add an outgoing label, corresponding to the next LSP segment, to the label stack of the packet.

25. The stitching point routing device of claim 24, wherein when the plurality of routing devices of the next LSP segment supports entropy labels, the one or more processors are configured to add the outgoing label above the entropy label in the label stack.

26. The stitching point routing device of claim 18, wherein the one or more processors are further configured to, when the previous LSP segment supports entropy labels, the plurality of routing devices of the next LSP segment supports entropy labels, and the label stack includes the entropy label, omit removal of the entropy label.

27. A computer-readable storage medium having stored thereon instructions that, when executed, cause a processor of a stitching point routing device that stitches a previous label switched path (LSP) segment of an end-to-end LSP to a next LSP segment of the end-to-end LSP, wherein the next LSP segment includes a plurality of routing devices, to:
determine whether the plurality of routing devices of the next LSP segment supports entropy labels;
determine whether a packet received from the previous LSP segment is encapsulated by a label stack including an entropy label;
when the plurality of routing devices of the next LSP segment does not support entropy labels and when the packet is encapsulated by the label stack including the entropy label, remove the entropy label from the label stack;
when the plurality of routing devices of the next LSP segment supports entropy labels and when the packet is not encapsulated by the label stack including the entropy label, add an entropy label to the label stack; and
forward the packet along the next LSP segment.

* * * * *